United States Patent [19]

Nambu

[11] Patent Number: 5,166,933
[45] Date of Patent: Nov. 24, 1992

[54] METHOD FOR TRANSMITTING DATA AND DATA TRANSMITTING APPARATUS INCLUDING ERRONEOUS DATA DISTRIBUTION DETECTOR

[75] Inventor: Shigeo Nambu, Fuchu, Japan

[73] Assignee: Kabushiki Kaisha Toshiba, Kawasaki, Japan

[21] Appl. No.: 443,458

[22] Filed: Nov. 30, 1989

[30] Foreign Application Priority Data

Nov. 30, 1988 [JP] Japan ................................ 63-300751

[51] Int. Cl.[5] ............................................. G06F 11/00
[52] U.S. Cl. ..................................... 371/8.2; 371/11.2; 371/68.2
[58] Field of Search ...................... 371/8.2, 11.2, 68.2; 370/16.1, 16; 340/825.01, 827, 825.16; 455/8, 179, 185

[56] References Cited

U.S. PATENT DOCUMENTS

| | | | |
|---|---|---|---|
| 3,476,922 | 11/1969 | Yiotis | 371/8.2 |
| 4,030,069 | 6/1977 | Hendrickson | 455/8 X |
| 4,264,893 | 4/1981 | Hutch | 371/8.2 X |
| 4,463,350 | 7/1984 | Kajiura | 340/825.01 |
| 4,627,045 | 12/1986 | Olson | 371/8.2 X |
| 4,633,473 | 12/1986 | Ratchford | 371/8.2 |
| 4,878,049 | 10/1989 | Ochiai | 371/8.2 X |
| 4,961,190 | 10/1990 | Nakajima | 371/8.2 |

*Primary Examiner*—Robert W. Beausoliel
*Assistant Examiner*—Ly V. Hua
*Attorney, Agent, or Firm*—Foley & Lardner

[57] ABSTRACT

In a multi-data transmission system utilizing two or more parallel data-transmission lines in LAN, erroneous data distribution occurring in the data-transmission lines is detectable. A data transmission apparatus includes: a plurality of data-transmission lines arranged in parallel with each other, and a plurality of transmission stations coupled via the plurality of data-transmission lines to each other. Each of the transmission stations includes adders for adding to send data, transmission-line information representative of a specific data-transmission line so as to obtain send data with the specific line information; and, receiver/detector for receiving the send data with the specific line information which has been transmitted from one transmission station, in order to judge whether or not the received send data contains the correct specific line information. Accordingly, erroneous data distribution occurring in the data-transmission lines can be detected.

7 Claims, 3 Drawing Sheets

METHOD FOR TRANSMITTING DATA AND DATA TRANSMITTING APPARATUS INCLUDING ERRONEOUS DATA DISTRIBUTION DETECTOR

BACKGROUND OF THE INVENTION

1. Field of the Invention

The present invention generally relates to a data transmission system with simultaneously utilizing more than two parallel data-transmission lines used in an LAN (local area network). More specifically, the present invention is directed to a data transmission method and apparatus capable of detecting erroneous data distribution in such a local area network.

2. Description of the Related Art

In the above-described conventional multi-data transmission system, a plurality of data transmission stations are coupled with each other via more than two parallel data transmission lines made of coaxial cable or optical cables. In a normal condition, these data are transmitted among the data transmission stations by simultaneously utilizing all of the data transmission lines, or alternately utilizing these data transmission lines. In the case of failure of any one of the data transmission lines, the data transmission can be continuously performed among the data transmission stations with use of other non-failed data transmission lines.

As a result, higher reliabilities on the line malfunction can be achieved in such a multi-data transmission system, as compared with the single data transmission line. This, the multi-data transmission system is generally suitable for transmitting the important data.

Such a conventional multi-data transmission system per se is known as those in the art, for instance, Japanese KOKAI (Disclosure) patent application No. 58-62949 opened on Apr. 14, 1983, filed by the same Applicant.

In the conventional multi-data transmission system, since two or more data transmission lines are employed therein, there are provided a large quantity of electronic and mechanical parts, such as coaxial cables (including optical fiber cables), connectors, cable taps and repeaters on the data transmission lines. Accordingly, great possibilities may exist in that one data transmission line is mistakenly connected to the irrelevant data transmission line due to the careless mistake by the cable joint worker, which is the so-called "erroneous data distribution".

In such erroneous data distribution, since the same data are normally transferred to all of the data-transmission lines in the conventional multi-data transmission system, each of the data transmission stations can receive these data without any problem even if the erroneous data distribution occurs in the data transmission line. In other words, there is no measure to detect such erroneous data distribution occurring on the data transmission line.

If a failure or malfunction happens to occur in the data transmission line on which the erroneous data distribution occurs, all of the data transmission stations are connected to a given data transmission line. However, even when the respective data transmission stations are attempted to be connected to the expected data transmission lines, all of the data transmission stations are not always connected to the correct data transmission lines, respectively. This causes unsatisfactory data reception.

In other words, according to the conventional multi-data transmission system, even when there is the erroneous data distribution on the data transmission line 9, normal data transmission can be performed unless there is no line failure, e.g., line interruption.

The present invention has been made in an attempt to solve the above-described problems of the conventional multi-data transmission system, and therefore has an object to provide a data transmitting method and a data transmission apparatus capable of immediately detecting erroneous data distribution on the data transmission line. Accordingly, the necessary measures can be taken for repairing the erroneous data distribution on the transmission line, and thus when all of the data transmission stations are changed to be connected to a given data transmission line, due to the malfunction of the data transmission line, the correct line connections can be achieved.

SUMMARY OF THE INVENTION

The above-described object and other features of the invention are accomplished by providing: a method for transmitting send data through a plurality of data-transmission lines (LINE-1: LINE-2) arranged in parallel to each other among a plurality of transmission stations (50A: 50B) coupled via the data-transmission lines (LINE-1: LINE-2) to each other, comprising the steps of:

adding to the send data, transmission-line information indicative of a specific data-transmission line (LINE-1: LINE-2) so as to obtain send data with the specific line information in one transmission station (50A);

transmitting the send data with the specific line information from said one transmission station (50A) to other transmission stations (50B); and, receiving said send data in said other transmission stations (50B) so as to judge whether or not said received send data contains the correct specific line information, whereby erroneous data distribution occurring in the data-transmission lines (LINE-1: LINE-2) can be detected.

Furthermore, a multi-data transmission system (100) comprises: a plurality of data-transmission lines (LINE-1: LINE-2) arranged in parallel with each other; and, a plurality of transmission stations (50A: 50B) coupled via said plurality of data-transmission lines (LINE-1: LINE-2) to each other, each of said transmission stations (50A: 50B) including;

means (2: 4) for adding to send data, transmission-line information representative of a specific data-transmission line (LINE-1: LINE-2) so as to obtain send data with the specific line information; and, means (6: 7: 8: 9) for receiving said send data with the specific line information which has been transmitted from one transmission station (50A: 50B), in order to judge whether or not said received send data contains the correct specific line information, whereby erroneous data distribution occurring in the data-transmission lines (LINE-1: LINE-2) can be detected.

According to the data transmission system of the present invention, since the error in the line information can be immediately judged by the line information judging means in case of the erroneous data distribution occurring on the data transmission line, an easy confirmation may be achieved to check whether or not the erroneous data distribution is provided on the relevant data transmission line.

BRIEF DESCRIPTION OF THE DRAWINGS

For a better understanding of the invention, reference is made to the following descriptions in conjunction with the accompanying drawings: in which.

DETAILED DESCRIPTION OF THE PREFERRED EMBODIMENTS

Overall Circuit of Data Transmission Apparatus

Figure 1:
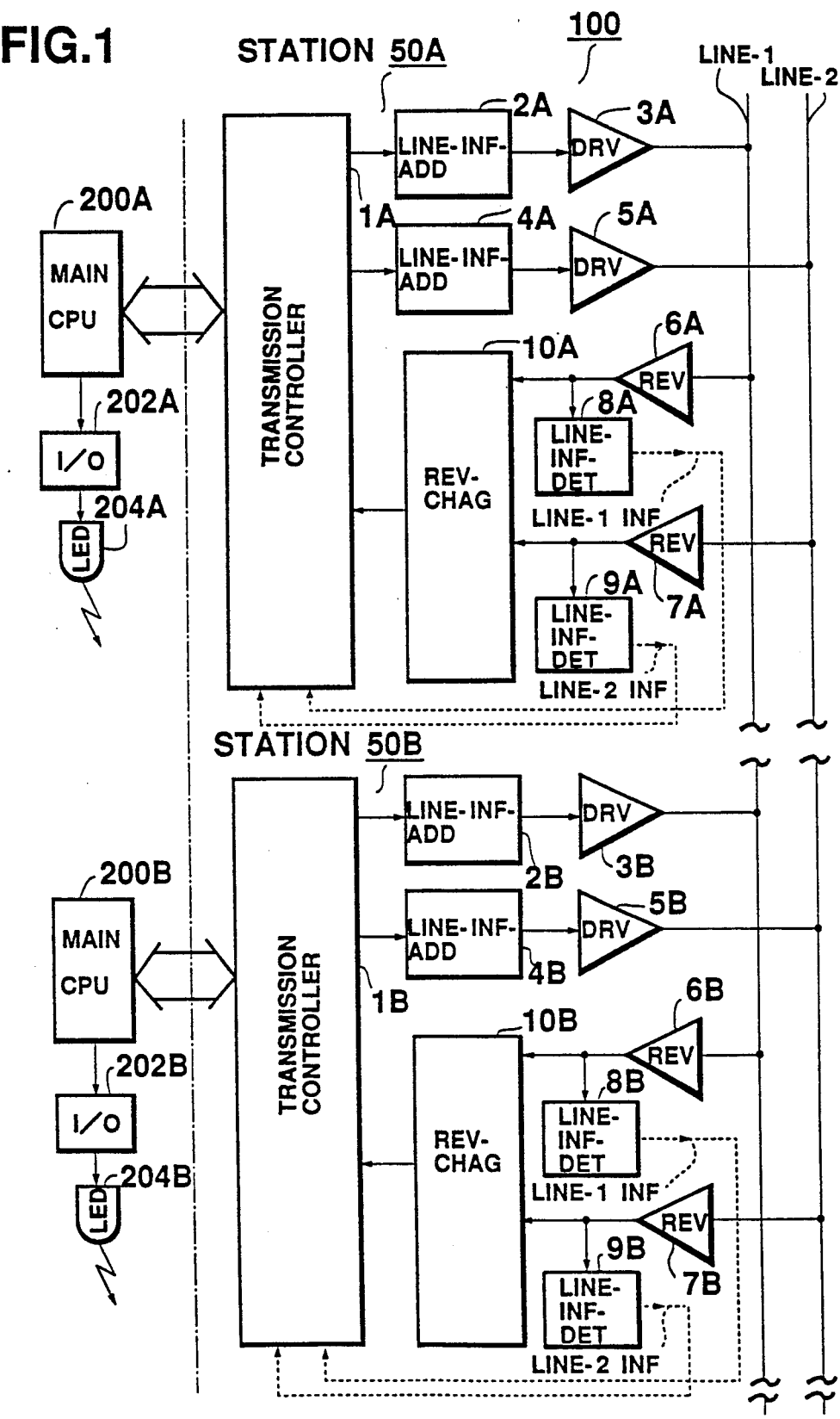
FIG. 1 is a schematic block diagram of a data transmission apparatus 100 according to a preferred embodiment of the invention.

In FIG. 1, there is shown a schematic block diagram of a data transmission apparatus 100 according to a preferred embodiment of the invention.

In the data transmission apparatus 100, a plurality of data transmission stations 50A, 50B (i.e., only two data transmission stations are illustrated in FIG. 1) are coupled to each other via two parallel data transmission lines "LINE-1" and "LINE-2". It should be noted that since these transmission stations 50A and 50B each has the completely same configuration with each other, the following description will be made only to one transmission station 50A. That is, in the first transmission station 50A, a transmission controller 1A is connected via a line information adding circuit 2A and a driver 3A to the first data transmission line LINE-1. Similarly, the transmission controller 1A is connected via another line information adding circuit 4A and another driver 5A to the second data transmission line "LINE-2". Thus, after the corresponding line information from the line information adding circuits 2A, 4A has been added to a set of predetermined data in the respective line information adding circuits 2A and 4A, the resultant data are supplied to the corresponding data transmission lines "LINE-1" and "LINE-2" (will be discussed later).

Data on the first data transmission line "LINE-1" (for instance, transmitted from the second transmission station 50B), is supplied via a receiver 6A to a receiver changing circuit 10A and also a line information judging circuit 8A. Similarly, another data on the second data transmission line "LINE-2" is furnished via another receiver 7A to another receiver changing circuit 10A and also another line information judging circuit 9A. An output derived from the receiver changing circuit 10A is supplied to the transmission controller 1A.

On the other hand, the transfer controller 1A employed in the first data transfer station 50A is connected to a main CPU (central processing unit) 200A externally provided with the data transmission apparatus 100. A light emitting diode (LED) 204A is connected via an input/output port 202A to this main CPU 200A. As will be discussed later, LED 204A has such a function to indicate an alarm condition to an operator while the erroneous data distribution is detected by the data transmission apparatus 100.

A microprocessor (not shown in detail) is employed in the transmission controller 1A so as to control the overall operation of this transmission station 50A.

Briefly stating, in accordance with the data transmission system of the preferred embodiment, a plurality of transmission stations 50A, 50B,—are connected together via two data transmission lines "LINE-1" and "LINE-2". In a normal operating condition, the data are transmitted by simultaneously using all (two) of the data transmission lines "LINE-1" and "LINE-2". When a line failure or malfunction may happen in either data transmission line (for instance, in the first data transmission line "LINE-1"), the data transmission is continued among all of the transmission stations 50A, 50B,—by utilizing the other data transmission line "LINE-2".

Data Transmission

Referring now to the data transmission apparatus 100 depicted in FIG. 1, the erroneous data distribution will be described.

First, in case that no erroneous data distribution occurs in either data transmission line "LINE-1" or "LINE-2", two pieces of send data having identical contents to each other are simultaneously output from the first transmission controller 1A. These send data are fed out to the first and second data transmission lines "LINE-1" and "LINE-2" via the respective line information adding circuits 2A, 3A and respective drivers 3A, 5A.

The function of the line information adding circuit 2A is to add one transmission line information to the send data, which represents that this send data has been delivered to the first data transmission line "LINE-1". Similarly, the function of the line information adding circuit 4A is to add another transmission line information to the send data, which indicates that this send data has been supplied to the second data transmission line "LINE-2". A detailed line information adding operation will be described later.

On the other hand, other send data which have been transferred via the first data transmission line "LINE-1" and second data transmission line "LINE-2" from other transmission stations, for instance, second transmission station 50B, are simultaneously received via the receivers 6A and 7A employed in the first transmission station 50A, and then are alternatively input via the receiver changing circuit 10A to the transmission controller 1A, and via the judging circuits 8A and 9A thereto.

As a consequence, in the transmission controller 1A, a check is made to the data transmission error based upon the line information which have been added to the send data transferred via the first and second data transmission lines "LINE-1", "LINE-2" from the second transmission station 50B whereby the data transmission is realized with higher reliability.

If any failure (e.g., a line interruption, a malfunction of receivers 6, 7) occurring in either the first or second transmission line LINE-1, or LINE-2 is detected by the known detecting means (not shown), the data transmission lines are switched in all of the transmission controllers 1A, 1B,—in such a manner that the send data are transferred via a predetermined data transmission line (e.g., the first data transmission line "LINE-1").

Under such a circumstance, if the above-described erroneous data distribution occurs in the data transmission line, the data transmission is not available in the conventional data transmission system, as previously explained.

To the contrary, such a difficulty could be solved according to the data transmission system of the invention by utilizing the line information adding circuits 2, 4 and line information judging circuits 8, 9.

Line Information Addition

The line information addition to the send data carried out by the line information adding circuits 2 and 4 respectively will now be described more in detail.

Figure 2:
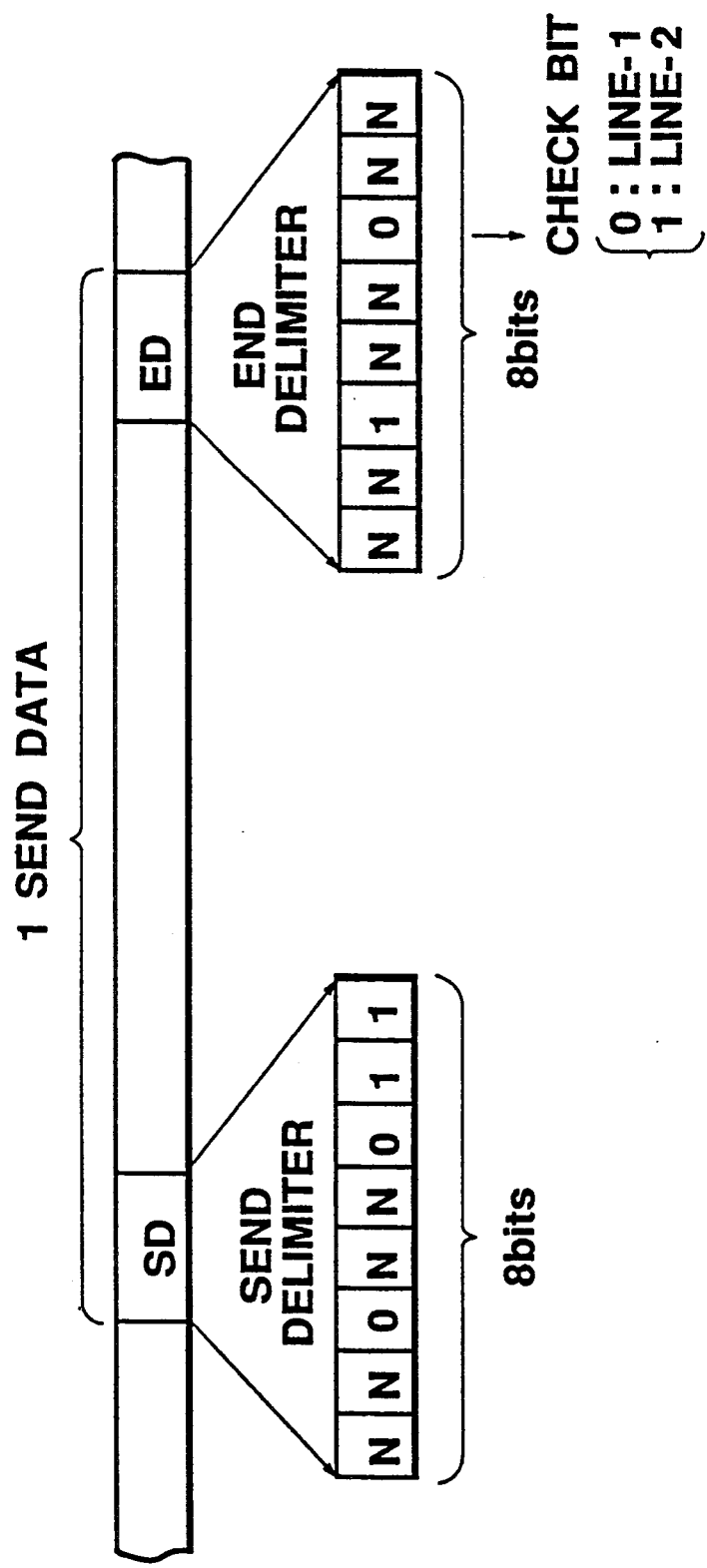
FIG. 2 illustrates a data format of the send data containing the end delimiter used in the data transmission apparatus 100; and, FIG. 3 schematically shows an internal circuit of the line judgement circuit 8A employed in the data transmission apparatus 100.

In FIG. 2, there is represented a data format used in the data transmission apparatus 100 according to the present invention. This data format corresponds to, for instance, the token passing bus of IEEE rule 802.4.

As illustrated in FIG. 2, if 1-bit information which corresponds to 3rd bit from LSB (least significant bit) of the end delimiter of single send data, indicates "0", then this send data represents the data being transferred via the first data transmission line "LINE-1". Conversely, if this 1-bit information indicates "1", then this send data has been transferred via the second transmission line "LINE-2". As explained above, the line information adding circuits 2 and 4 are so operated that the relevant line information is added to the third bit information from the LSB of every end delimiter.

Line Judging Circuit

The line information judging operations by the judging circuits 8A and 9A as the major circuit of the data transmission apparatus 100 will now be described.

Typically, the judging circuit 8A detects the above-described line information which has been added to the send data received via the first data transmission line "LINE-1" so as to judge whether or not the detected line information indicates the first data transmission line "LINE-1". Similarly, another judging circuit 9A detects the line information which has been added to the send data received via the second data transmission line "LINE-2" in order to judge whether or not the detected line information indicates the second data transmission line "LINE-2". The resultant data from the line information judging circuits 8A and 9A are delivered to the transmission controller 1A.

As a result, the transmission controller 1A can recognize a fact that the erroneous data distribution occurs in the data transmission line based upon the resultant data supplied from these line information judging circuits 8A and 9A.

Figure 3:
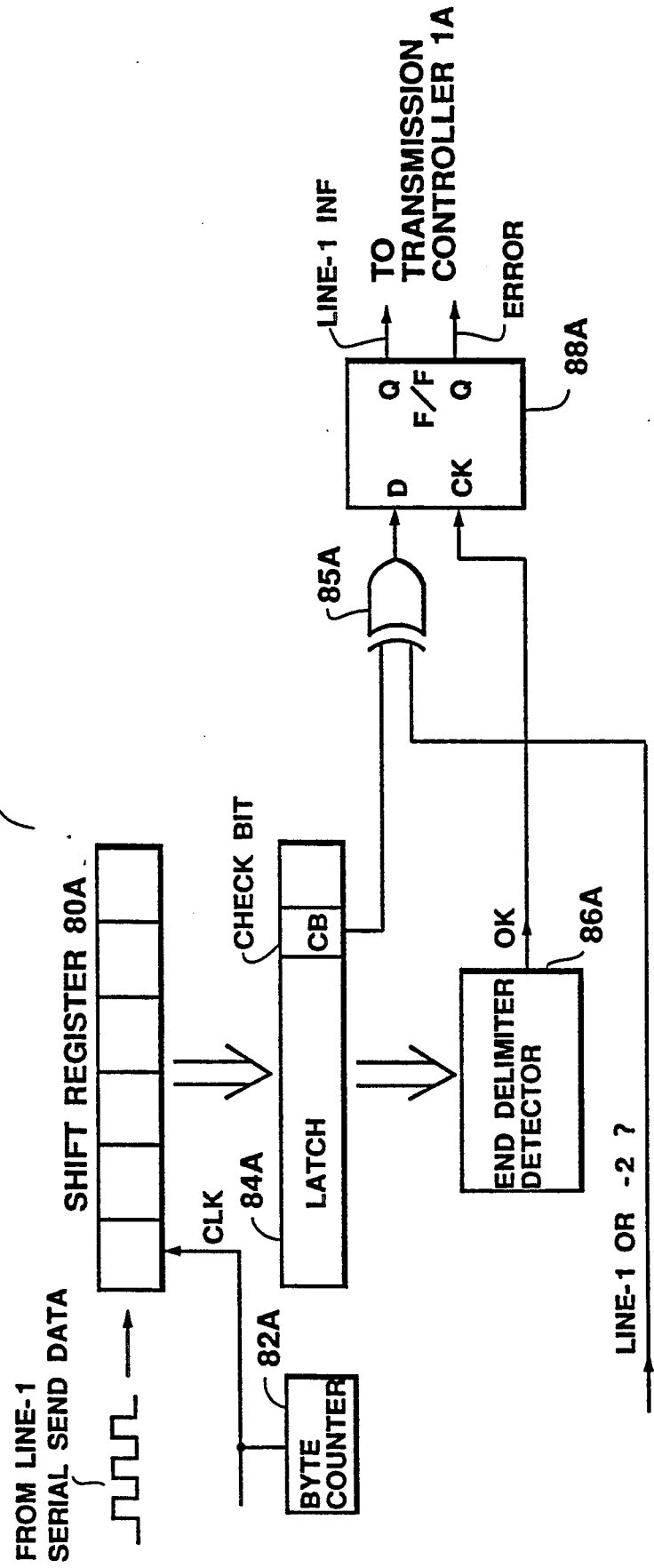

Referring now to FIG. 3, an internal circuit of the line information judging circuit 8A will now be described.

The serial send data supplied from the first data transmission line LINE-1 is temporarily stored in a shift register 80A. When a byte counter 82A counts up and outputs a byte signal, then the serial send data which has been temporarily stored in the shift register 80A is latched in a latch 84A. The check bit of the latched data is supplied to one input of an exclusive OR gate 85A, whereas a line 1 or 2 interrogating signal is supplied to the other input of this exclusive OR gate 85A. The end delimiter of the serial send data latched in the latch 84A is detected by an end delimiter detector 86A so as to supply the detection result of the end delimiter detector 86A to a clock terminal of a flip-flop 88A. An output of the exclusive OR gate 85A is supplied to an input of this flip-flop 88A. Both the exclusive OR gate 85A and flip-flop 88A constitute a comparator. This comparator compares the check bit of the end delimiter contained in the latched serial send data with the interrogating signal in order to judge which line information has been added to the serial send data.

With the above-described circuit arrangement, the data transmission apparatus 100 has the following advantages. That is, in case that the erroneous data distribution happens in either the first or second data transmission lines "LINE-1", "LINE-2", since the send data, for instance, transferred to the first data transmission line "LINE-1" within the second transmission station 50B is received from the second data transmission line LINE-2 in the first transmission station 50A, the judging circuits 8A and 9A can judge such a fact that the erroneous data distribution may occur therein. Then, the transmission controller 1A becomes operable in response to the judging results supplied from the judging circuits 8A and 9A, and an operator can immediately recognize such a failure on the data transmission line by turning ON LED 204A under the control of the main CPU 200A. Accordingly, such erroneous data distribution can be readily repaired.

In accordance with the present invention, when all of the transmission stations 50A, 50B,—are changed to be coupled to a given data transmission line due to the malfunction occurring in either data transmission line "LINE-1" or "LINE-2", such a line changing operation can be confirmedly performed.

Precisely speaking, in accordance with the preferred embodiment, such an erroneous data distribution occurring in the data-transmission line "LINE-1", "LINE-2" can be further correctly detected by performing the above-described check-bit inspection, and simultaneously recording the source address (i.e., an address of a send transmission station) of the packet, and furthermore matrixing the address of the respective transmission stations 50A: 50B coupled to the corresponding data-transmission lines "LINE-1", "LINE-2" with the results of the checking operation.

Modifications

The present invention is not restricted to the above-described preferred embodiments, but may be changed, substituted, and modified without departing from the technical scope and spirit of the present invention.

For instance, data having the same contents may be alternately supplied sent to the first and second data transmission lines LINE-1 and LINE-2, respectively. Moreover, two pieces of data having different contents with each other may be alternately to the first and second data transmission lines LINE-1 and LINE-2.

Although the number of the data transmission lines was selected to be two in the above-described preferred embodiment, any other line numbers more than 2 may be employed. In the latter case, the remaining data transmission lines except for the failed transmission line may be properly selected for the data transmission purpose.

While the present invention has been described above, according the data transmission apparatus, since an error in line information can be immediately judged by the line information judging means in case that the erroneous data distribution occurs in the data transmission line, recognition can be made that the erroneous data distribution occurs on the data transmission line, based upon the line information judging result. As previously described, as the necessary repairing procedure can be immediately taken for the erroneous data distribution, the send data can be transferred without any problems when all of the transmission stations are coupled to a given data transmission line after the malfunction of other lines has been detected, resulting in the highly reliable data transmission by the multi-data transmission system.

What is claimed is:

1. A method for simultaneously transmitting send data through a plurality of data-transmission lines arranged in parallel to each other among a plurality of transmission stations coupled via the data-transmission lines to each other, comprising the steps of:
   adding to the send data, transmission-line information indicative of a specific data-transmission line so as to obtain send data with the specific line of information in one transmission station;
   transmitting the send data with the specific line information from said one transmission station to other transmission stations; and
   receiving said send data in said other transmission stations, so as to judge whether or not said send data contains correct line information specific to a transmission station whereby erroneous data distribution occurring in the data-transmission lines is detected.

2. A method as claimed in claim 1, wherein a plurality of said send data with the specific line information are simultaneously transmitted from said one transmission station to said other transmission station.

3. A method as claimed in claim 1, wherein a plurality of said send data with the specific line information are alternately transmitted from said one transmission station to said other transmission station.

4. A data transmission apparatus comprising:
   a plurality of data-transmission lines arranged in parallel to each other and simultaneously transmitting send data; and,
   a plurality of transmission stations coupled via said plurality of data-transmission lines to each other, each of said transmission stations including:
   means for adding to said send data, transmission-line information representative of a specific data-transmission line so as to obtain send data with the specific line information; and
   means for receiving said send data with the specific line information which has been transmitted from one transmission station, in order to judge whether or not said received send data contains correct line information specific to a transmission station, whereby erroneous data distribution occurring in the data-transmission lines is detected.

5. A data transmission apparatus as claimed in claim 4, wherein said one transmission station simultaneously transmits a plurality of send data with the specific line information via said plurality of data-transmission lines to said other transmission stations.

6. A data transmission apparatus as claimed in claim 4, wherein said one transmission station alternately transmits a plurality of send data with the specific line information via said plurality of data-transmission lines to said other transmission stations.

7. A data transmission apparatus as claimed in claim 4, wherein said receiving means includes:
   a shift register for temporarily storing said send data with the specific line information;
   a latch circuit for latching the send data with the specific line information delivered from the shift register after a predetermined time has elapsed; and,
   a detector unit for detecting whether or not said specific line information of the latched send data is correct.

* * * * *